United States Patent [19]
Skoroszewski
[11] 3,812,228
[45] May 21, 1974

[54] INJECTION MOLDING OF FOAMABLE THERMOPLASTIC POLYMERS USING A RETRACTABLE HOT RUNNER

[75] Inventor: Wladyslaw H. Skoroszewski, Manchester, England
[73] Assignee: Shell Oil Company, Houston, Tex.

[22] Filed: Jan. 17, 1972
[21] Appl. No.: 218,474

Related U.S. Application Data
[62] Division of Ser. No. 55,651, June 17, 1970, Pat. No. 3,644,053.

[30] Foreign Application Priority Data
July 17, 1969 Great Britain ... 35994/69

[52] U.S. Cl. ... 264/54, 264/48, 264/328, 264/329, 264/DIG. 5, 264/DIG. 14, 264/DIG. 83
[51] Int. Cl. ... B29d 27/00, B29f 1/04, B29f 1/05
[58] Field of Search ... 264/51, 53, 54, DIG. 83, 264/328, 329, 48, DIG. 5, DIG. 14; 425/245

[56] References Cited
UNITED STATES PATENTS

| | | | |
|---|---|---|---|
| 2,923,031 | 2/1960 | Collion | 425/245 X |
| 3,252,184 | 5/1966 | Ninneman | 264/328 X |
| 3,376,608 | 4/1968 | Wilcox | 425/245 X |
| 2,871,517 | 2/1959 | Allard | 264/328 UX |
| 3,694,529 | 9/1972 | Josephsen et al. | 264/48 |

FOREIGN PATENTS OR APPLICATIONS

| | | | |
|---|---|---|---|
| 973,261 | 10/1964 | Great Britain | 264/328 |

*Primary Examiner*—Philip E. Anderson
*Attorney, Agent, or Firm*—Martin S. Baer; Norris E. Faringer

[57] ABSTRACT

A mold feed system for injection molding thermoplastic materials comprises (1) an apertured back plate having a passage for reception of molten thermoplastic materials from an injection nozzle, (2) a feedplate having at least one feed passage adapted to supply thermoplastic material to at least one mold cavity and disposed between said feedplate and said back plate a movable runner member having a single or manifold channel to register communication between the back plate passage and each feedplate passage, said runner member being disposed in heat transfer relation to a source of heat and adapted to form a pressure tight seal of said channel and all of said passages when slid away from the said open position.

2 Claims, 7 Drawing Figures 1 2 3 4 5 6 26 7 8 9 11 12 14 15 16 17 18, 19 10 25 7 9 8 23 22 20 13

PATENTED MAY 21 1974 3,812,228

INJECTION MOLDING OF FOAMABLE THERMOPLASTIC POLYMERS USING A RETRACTABLE HOT RUNNER

This is a division, of application, Ser. No. 55,651, filed July 17, 1970, now U.S. Pat. No. 3,644,053.

The present invention is concerned with the manufacture of articles from thermoplastic material by injection molding, and with apparatus suitable for use in the manufacture thereof.

The term "thermoplastic material" is used herein to denote organic polymers which are thermoplastic under the conditions of injection molding, including resins for polymer compositions capable of hardening or setting to an infusible state. In the latter case the injection molding should of course be carried out before the hardening or setting stage is reached.

A wide variety of injection molding processes have been utilized to mold thermoplastic materials, in all of which heated molding material is forced under pressure through an injection nozzle into the mold cavity. In some techniques the injection nozzle is withdrawn after the molten material has been injected, but whether or not the injection nozzle is retractable it is always necessary to provide some means for controlling the flow of material so that it only occurs at the appropriate phase of the injection cycle. Flow of material from the extrusion ram is normally controlled by a valve inserted immediately upstream of the injection nozzle, but a particular problem arises with the injection molding of cellular articles, since the foamable injection melt expands on removal of the injection pressure and it is therefore necessary to control the injected material as well.

These cellular articles are formed from a melt of foamable molten thermoplastic material, e.g., a polyolefin, and contain a "foaming agent" which, under appropriate temperature and pressure conditions, will generate a cellular structure within said thermoplastic material. The foaming agent may be a volatile, normally liquid substance, e.g., technical pentane, and foaming agents are well known in the art for making expanded (i.e. cellular or foamed) polystyrene. Preferably the foaming agent is of the chemical type, i.e. a substance or mixture thereof which, for example, under elevated temperature conditions will form a gas, e.g., carbon dioxide or nitrogen, capable of forming the required cellular structure in a thermoplastic material; foaming agents of this kind are known in the art for making, e.g., cellular polyolefins and polystyrene. Whatever the kind of foaming agent used, the foaming depends upon the generation or release within the molten mass of a large number of discrete bubbles of gas or vapor, which expand to form the cells of the ultimate cellular articles, as the pressure of the mass is decreased. These cells remain as a permanent characteristic thereof if the molded article is cooled after the molding operation has been effected. It has been found possible to manufacture cellular articles from foamable thermoplastic materials by injection molding, although, as will become apparent from the following description, certain problems, which do not occur when injection molding non-foamable materials, have to be overcome.

There are many advantages of molded cellular articles as compared with otherwise similar non-cellular articles. For example the former can be as strong as or stronger than the latter, but are less dense. In general, such cellular articles, comprising a cellular core and an integral, non-cellular skin have a structure which is rigid, have improved dimensional stability as compared with otherwise similar non-cellular articles and contain less molded-in stress. These advantages open up the possibility of utilizing thermoplastics in applications for which thermoplastics were not hitherto considered suitable.

One of the difficulties encountered in molding cellular articles from an expandable melt is that it is often not practicable to use the conventional technique of retracting the injection nozzle after the charge of molten material has been injected into the mold, since the material remaining in the sprue tends to expand in the direction of the nozzle and to unite with the expanding material remaining in the nozzle tip. Solidification of the material then makes it difficult or even impossible to remove the molded cellular article from the mold in the usual way.

Particular difficulties arise when using the 'multigate' technique in which molten material is fed simultaneously to more than one molding cavity or to different points on a single mold cavity, since it is normally necessary to use large runners to ensure even distribution of molten material during its rapid injection from the injection nozzle. As a result of the large amount of material retained in the runners it is often found that the cooling of these runners takes so long that it effectively limits the cycle time that can be achieved on the molding process. These problems can be overcome by the use of a hot runner technique in which the runners are not allowed to cool, but are shut-off from the mold cavity and the material contained in the runner incorporated in the next charge of injected material. However, this procedure is difficult to apply to the molding of expandable melts because unless the molten material in the hot runner is maintained under pressure the expanding gas will escape and result in the subsequent charge incorporating material containing an insufficient amount of expanding agent.

It has now been found that a slideable hot runner which functions both as hot runner and as shut-off valve is an effective means of overcoming these problems. (The term "slideable" as used throughout this specification includes both a lateral and a rotatary sliding movement). Accordingly in one aspect the invention comprises a mold-feed system suitable for use in the injection molding of thermoplastic materials, particularly foamable materials, which comprises in combination an apertured back plate having a passage for the reception of molten thermoplastic material from an injection nozzle, a feedplate having one or more feed passages adapted to supply molten thermoplastic material to one or more mold cavities or to different points of a single mold cavity, and between said feedplate and said back plate a slideably movable runner member as hereinbefore defined, having a single or manifold channel located in an open position to register communications between the back plate passage and each of the feedplate passages, the said runner member being connected to a source of heat and being adapted to form a pressure-tight seal of the said channel and all of the said passages when slid away from the said open position.

In operation an injection nozzle is located in forced engagement with the back plate to connect with the passage therein. The heated runner manifold is opened simultaneously with the injection of a charge of molten material through the runner channel into the feed passages until the mold cavities are filled. The runner is then slid a sufficient distance to close the passages and seal the runner channel, and when the mold has cooled the cavities are opened, the molded articles removed and the mold replaced. The runner is then returned to the open position enabling the pressure of material in the injection nozzle to force the contents of the hot runner into the mold cavities and continue to feed material until the mold cavities are once more filled. Accordingly it will be apparent that the molding cycle does not have to be delayed to permit cooling of the runners, and also the material in the runner channel is maintained both hot and under pressure so that it can form part of the next charge of material without any loss of quality.

The temperature gradient between the heated manifold and the mold cavity permits freeze-off to occur in the feed at a point just below the manifold. This permits the feed points to cool at a similar rate to the molding and hence the overall cycle is unimpaired. A clean break between the manifold and the feed also results and this obviates any difficulties in removing the molded article (molding) from the cavity. Ejection of the molding is facilitated in the usual way with the feed becoming an integral part of the molding. In the case of sprue feeds, these can be removed afterwards by conventional trimming techniques, e.g., machining and the like.

From the earlier introductory comments it will be apparent that the apparatus is of particular value in overcoming the problems associated with the multi-gate molding of foamable materials, in which case the runner channel is of manifold construction adapted to communicate simultaneously with a plurality of feed-plate passages, which in turn communicate with a plurality of mold cavities. However, the principle is not limited to this application but can be employed also for the injection of material from a plurality of feed passages into a single, large mold cavity, or for the simple case where a single feed passage communicates with a single mold cavity.

With multi-feed points in a manifold system it is essential that these should be balanced in area in order to ensure uniform filling of the cavity. This is particularly true with a structural foam since density variations can occur in the molding when the feed system is unbalanced. Although uniform cavity fill is normally achieved with a linear sliding manifold a rotary sliding manifold is particularly suitable for multicavities.

With both systems, however, the injection rate is proportional to the number of feed points. With a single feed the injection rate of for example, 1,000 g/sec would be reduced to 250 g/sec if a 4-feed system was used. The full benefit of injection rate of the machine is therefore not utilized at each cavity. When the mold cavities are of equal volume there is no necessity to balance the feeds. However, with cavities having unequal volume the most convenient method of feed balancing can be achieved by adjusting the feed orifice, either at the sprue bush or in the spherical seated washer.

In the design and operation of the multi-feed lateral sliding manifold, an important factor in seal effectiveness is the position of the spherical seated washer in relation to each sprue bush. Alignment of the feed orifice in the washer and sprue bush must be identical for each feed point to ensure equal metering of polymer to each cavity. In a multi-feed system viscosity variation due to fluctuation of temperature can affect flow to each mold cavity. Heat input to the manifold is therefore important. Consequently it is advantageous that the heat at each feed point should be independently controlled, e.g., by means of an individual thermocouple and variable heater. Pressure fluctuations to each cavity will, of course, be obviated where the feed orifices are identical.

These considerations apply equally to the design and operation of the rotary sliding manifold. The angular movement of the manifold may be effected by hydraulic, pneumatic or mechanical/electrical means, synchronized to operate simultaneously with commencement of injection on the molding machine. The manifold plate may have a central shaft housed by a bearing in the mold to provide the center for rotation. The bearing is preferably thermally insulated from the mold to prevent passage of heat from the manifold.

Alternatively the shaft may be fitted to the mold and an insulated bearing incorporated in the manifold. This method is desirable when thin cavity plates are used for mold construction.

Lateral and rotary sliding multi-feed manifolds can be modified in design and operation for molds having unequal cavity volume. With the conventional manifolds the molding shot is metered simultaneously in equal amounts to each cavity when the manifold has travelled a predetermined distance to a fixed stop. At this point the feed orifice to each cavity is open until the cavities are filled. The manifold is then returned to its starting position.

In a modified system the correct amount of material may be delivered to each cavity irrespective of differences in cavity volume. This system is one of sequential gating which has the advantage that moldings of equal density are produced from unequal mold cavities, cavity filling is therefore achieved at maximum injection speed and metering of material into each cavity is controlled by the rate of movement of the manifold. In operation, the speed of manifold closing is variable to compensate for variations in volume of each cavity. Since closure is rapid it is essential that the manifold movement is accurately controlled to meter the correct volume of polymer into each cavity. In construction the manifold design is substantially the same as lateral and rotary sliding types described above, the major difference being in the very accurate control mechanism required to ensure that sequential gating is smooth in operation. This can be achieved by inclusion of a cam to regulate the movement of the manifold in relation to each feed position.

The disposition of the components of the above-defined feed system can be such as to permit any degree of slideable movement in the runner member, provided that this runner member has freedom to move a sufficient distance for the channel to be removed completely from communication with any of the passages and for the necessary closure seal to be established. In practice it has been found that for certain applications a slideable rotary movement is preferred, while for other application, a slideable lateral movement is preferred. For both lateral and rotary slideable movement it is convenient to limit the movement to the confines of the back and feed plates since in this way the sealing of the runner channel can be achieved simply by pressure of the channel inlet and outlet against the inner surface of the appropriate plate. The movement of the runner member is such as to maintain pressure contact between the faces of the runner members. Usually, and this has been found to be particularly advantageous, the said movement of the runner members is guided by spring-loaded plungers which also serve the function of providing a sealing pressure between the runner member and the feed or back plate. It is necessary that there is sliding contact between the plate surfaces in such a way that there is no - or substantially no - leakage of polymer from the feed channels. A convenient modification is one in which seating pads are located at the inlets and outlets of the feed system to and from the manifold. These pads preferably have spherical seatings - to compensate for possible misalignment of the manifold - and contain "polymer stop" grooves to minimize leakage across the seating face.

The runner member is disposed in heat transfer relation to a source of heat. Heating of the runner member during operation can be achieved by any convenient means; one suitable arrangement being electrically heated cartridge heaters contained within the manifold.

The mold may be cooled in the conventional manner, i.e. circulation of a heat transfer liquid through appropriate cooling channels therein. If the feedplate sprue bush is thermally insulated in accordance with the invention described in copending commonly assigned application Ser. No. 12555 of J. Czerski filed Feb. 19, 1970 and now abandoned, then the above defined methods of manufacturing cellular articles can be carried out using molds of simple construction having no special provision for cooling the sprue bush area. For example the injection pressures required when injection molding cellular polyolefin articles are such that relatively inexpensive molds made, for example, from an aluminum alloy, can be used and the avoidance of a cooling system for the sprue area is a significant cost reducing factor.

The feed plates and back plates, sprue bushes and runner manifold seatings which may be made from any suitable steel or alloy, are preferably case-hardened to resist the wear caused by the sliding of the runner manifold seating in the operation of the mechanism. The mold feed system according to the invention is suitably adapted to machines up to 200 tons clamp or more.

The present invention may be applied to the molding of a wide variety of profiles and articles such as boxes, cases and bowls. Although the apparatus is of particular value in the molding of expandable materials into cellular articles it can be suitably employed in the molding of any moldable thermoplastic material.

Thus, in a further embodiment, the invention provides a method for molding articles by injection molding which comprises charging a mold cavity with a melt of a thermoplastic material, which may be foamable, through an injection nozzle and a slideable runner member, as hereinbefore defined, moving the runner to break communication between the nozzle and mold cavity while retaining pressure within the runner, the nozzle, and the mold cavity, cooling the mold and removing the molded article, replacing the mold and moving the runner member to re-establish communication between the injection nozzle and the mold cavity, the runner member being held at a sufficiently high temperature to maintain the thermoplastic material contained therein in a molten state. The invention also includes articles produced by such a method of molding.

Suitable thermoplastic materials include, e.g., olefin polymers and copolymers such as polyethylene, polypropylene and copolymers of ethylene with other 1-olefins; polystyrene and vinyl resins including acrylonitrile/butadiene/styrene (ABS) polymers, polyvinyl halides, polyvinylidene halides, polyacrylates and nylons, polycarbonates polyoxyalkylenes and also plastics which comprise hardenable or thermosetting resins but which are thermoplastic under the conditions of, or at the stage of, injection molding in accordance with the invention, for example, epoxy resins. The term "thermoplastic material" as used herein, includes resins or polymers as such or containing additives, for example, stabilizers, antioxidants, lubricants, dyes and pigments, from nucleants as well as compositions comprising significant amounts of other components, e.g., fillers.

The invention is particularly applicable to a foamable thermoplastic material which may be formed from a thermoplastic material containing any suitable expanding or foaming agent such as an organic azo or nitroso compound, e.g., azodicarbonamide, dinitroso-pentamethylene-tetramine, azobisisobutyronitrile, pp'oxybis (benzenesulfonyl-hydrazide), toluene-(4) sulfonyl-hydrazide, or a carbonate which decomposes on heating to yield carbon dioxide, e.g., ammonium bicarbonate, sodium bicarbonate; or a volatile, normally liquid organic substance such as a hydrocarbon or chlorinated hydrocarbon having a normal boiling point below 100°C, for example, methyl chloride, trichloroethylene, technical pentane, isopentane, heptane and the like. A foaming agent which yields nitrogen or carbon dioxide on heating is preferred as presenting less fire hazard. A so-called nucleating agent, which may be a finely divided inert substance, e.g., metal oxides, calcium silicate, talc, silica gel and the like may also be present, if desired, to aid formation of the required gas or vapor bubbles. The foaming agent can be mixed with a thermoplastic material at any convenient and suitable stage, e.g., within the screw plasticizing section of a suitably modified screw pre-plasticizing injection molding machine in the case of a foaming agent such as pentane, or by homogeneously mixing it with polymer prior to feeding it to the machine in the case of a foaming agent which decomposes to yield a gas on heating.

In operation the standard sprue bush may be replaced by an insulated bush designed to give more local heat in the area of the spherical seated washer. The polymer at the top of the sprue thereby remains sufficiently soft to permit a free passage of polymer during injection of the next molding shot. Alternatively the spherical seated washer may be provided with a larger hole than that at the top of the sprue bush, resulting in a slug of polymer which presents a large diameter and surface area to the sprue bush when the manifold is in the closed position. This large diameter 'slug' provides additional insulation in the feed area of the manifold and the center of the slug is hot melt. This gradually cools during mold cooling but remains sufficiently soft to burst through when the injection pressure is applied at commencement of the next molding cycle. The ideal diameter for the 'slug' of polymer is equivalent to the internal diameter of the manifold drilling.

The type of molding apparatus, which can be used in conjunction with the mold-feed system of the present invention, may suitably comprise a conventional injection molding ram having a nozzle located in the back plate of the feed system, together with a mold which is secured to the feedplate and having mold cavities communicating with the passages in the feedplate, and the present invention accordingly includes such a complete molding apparatus when incorporating the mold-feed system hereinbefore described.

The present invention will be further described with reference to the accompanying drawings in which.

FIG. 4 a and b show, diagramatically, the rotatably slideable manifold system in the open and closed positions for a 4-cavity multi impression mold.

Figure 5A:
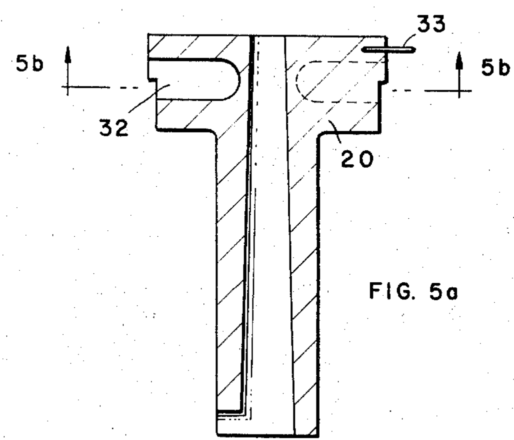
Figure 5B:
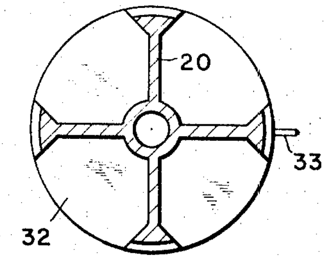

FIG. 5 a and b show vertical and horizontal sections along the center line of an air-insulated sprue bush which may be used in the sliding manifold.

Figure 1:
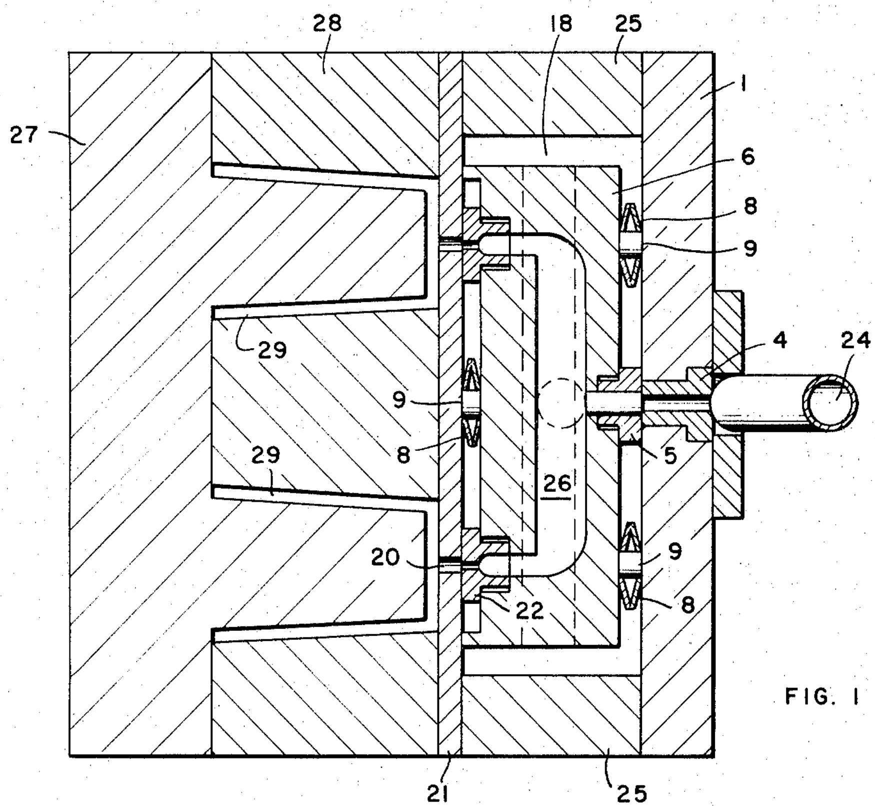
FIG. 1 is a diagrammatic horizontal section along the line of the runner channel of a laterally slideable manifold, showing in simplified form the application of the invention to a two cavity mold.
Figure 2:
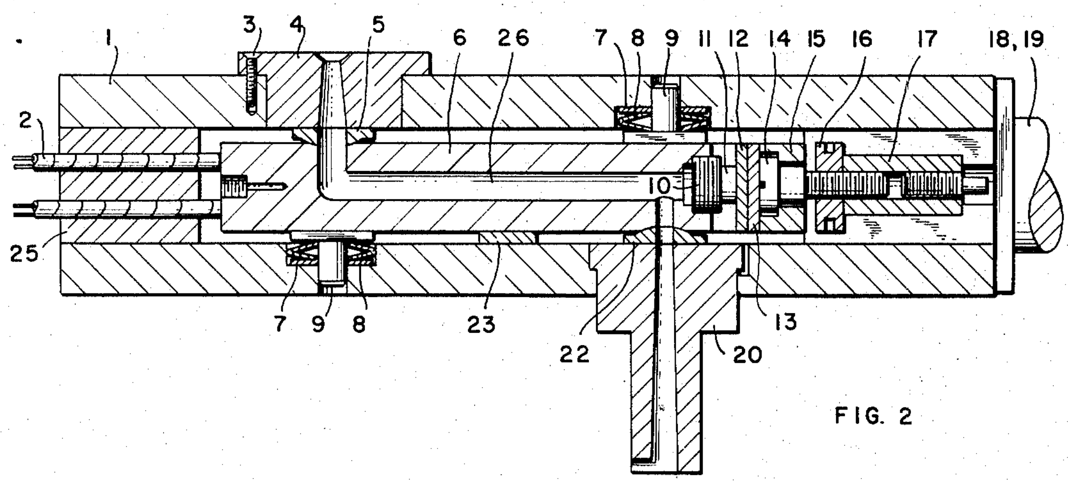
FIG. 2 is a vertical section along the center line of the runner channel of a laterally slideable manifold, showing in greater detail the precise construction of the feed system itself. For simplicity this drawing shows the application of the invention to a single cavity mold.

In FIGS. 1 and 2 like numerals denote like parts, and since they both refer to an essentially similar piece of equipment they will be described together. In reading the following description relating to FIGS. 1 and 2, it should therefore be borne in mind that, although all the major features are shown on both drawings, certain ancilliary or detail features may appear on only one drawing.

In FIGS. 1 and 2 the mold-feed system comprises a back plate 1 and a feedplate 21, separated by packing blocks 25 and containing between them a runner manifold block 6. Within the back plate 1 is located a sprue bush 4, held by screws 3, to which an injection nozzle shown diagrammatically as 24 may be attached. Within the feedplate 21 is located another srue bush 20. Runner manifold block 6 is provided at one end with cartridge heating elements 2 and contains a runner channel 26 whose exits correspond (in the open position illustrated) with the channels in sprue bushes 4 and 20. Pressure-tight contact between these exits in channel 26 and sprue bushes 4 and 20 is maintained by spherical seatings 5 and 22 against which runner block 6 is urged by spring washers 7 and 8 acting on plunger 9. Alternatively, the seal may be effected by the introduction of spring washers 7 and 8 between sprue bush 4 and the spherical seating 5, thereby causing local sealing pressure. Fine adjustment of the positioning of the runner block 6 is provided by an adjustable spacer 23. At the end distant from the heating elements 2 the runner block 6 is operatively connected to a hydraulic cylinder 18 and hydraulic valve 19 (shown diagrammatically). A profile pad is shown at 10, and retaining plug 11, insulating pad 12, plate 13, screwed stud 14, bridge plate 15, lock ring 16 and screwed bush 17. When assembled for use the feed system is secured to mold sections 27 and 28 so that mold cavities 29 are placed in communication with sprue bushes 20.

In operation of the system according to FIGS. 1 and 2, to produce molded objects, the runner manifold block 6 is moved by hydraulic cylinder 18 to the open position shown in the drawings, and raised to a suitable temperature by passing electric current through the cartridge heaters 2. Molten thermoplastic material is then fed under pressure from injection nozzle 24 through sprue bush 4, runner manifold channel 26 and sprue bush 20 into mold cavities 29. When these cavities are fully charged the runner manifold block is displaced laterally by the action of hydraulic cylinder 18, the direction of movement being downwards in FIG. 1 and towards the left in FIG. 2. This lateral movement causes seatings 5 and 22 to slide along the sprue bushes 4 and 20 respectively until the exits of runner channel 26 no longer communicate with the channels in these sprue bushes. Once this communication has been broken the movement of the runner is halted and the runner retained in the resulting 'shut-off' position. At this stage of the cycle a pressuretight sealing of channel 26 and the two sprue channels is provided by seatings 5 and 22 being urged against sprue bushes 4 and 20 by the action of spring washers 8 on plungers 9, and hence the injection pressure is maintained in the injection nozzle, the runner channels and the mold sprue and cavities.

The mold sections 27 and 28 are then cooled, and when their contents have solidified they are separated, the molded articles removed, and the mold replaced in position on the molding machine. During this cooling and emptying operation the thermoplastic material in the runner channel 26 has been retained molten by the action of heating elements 2 and under pressure by the seals between seatings 5 and 22 and sprue bushes 4 and 20. When the mold has been replaced the runner manifold block 6 is returned to the 'open' position by hydraulic cylinder 18, thereby re-establishing communication between injection nozzle 24, runner channel 26 and mold cavities 29. Molten thermoplastic material is then forced under pressure through sprue bush 4, runner manifold channel 26 and sprue bush 20 into mold cavities 29, and during this movement forces into the mold cavity the thermoplastic material which had been retained in the runner manifold channel during the cooling and emptying of the mold cavities. Since this material was maintained molten by heaters 2 and retained under pressure by the seating/sprue bush seals, it will be readily apparent to those skilled in the art that the method and apparatus of this invention is well-suited to the molding of a foamable thermoplastic melt because expanding gas is prevented from escaping from the material retained in the runner during the cooling and emptying of the molds.

Figure 3:
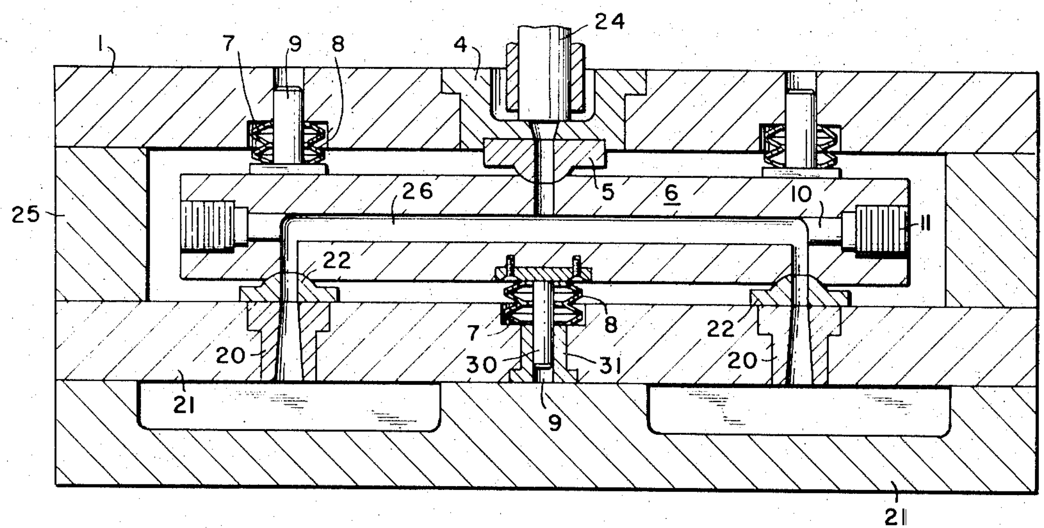
FIG. 3 is a vertical section along the center line of a runner channel of a rotatably slideable manifold showing the application of the invention to a double cavity mold.
Figure 4A:
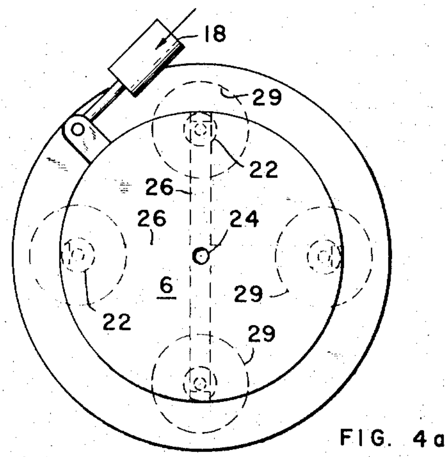
Figure 4B:
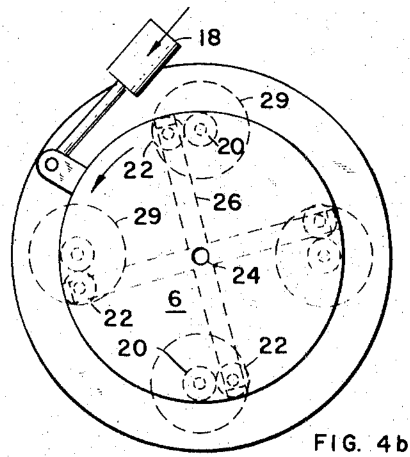

The design and operation of the rotary manifold shown in FIGS. 3 and 4*a* and 4*b* are very similar to those of the laterally slideable manifold and like numerals denote like parts. The angular movement of the manifold is effected by hydraulic, penumatic or mechanical/electrical means. The manifold plate has a central shaft 30 housed in bush 31. This provides the center for rotation and the bush is preferably thermally insulated from the mold to prevent passage of heat from the manifold.

Alternatively the shaft may be fitted to the mold and an insulated bearing incorporated in the manifold. This feature is preferred when thin cavity plates are used for mold construction.

FIGS. 5*a* and *b* show a sprue bush 20 having portions 32 cut away to permit air flow for insulation. Peg 33 is a location peg for maintaining the angular position of the sprue bush in the mold.

I claim as my invention:

1. A method for molding articles by injection molding which comprises charging a mold cavity with a melt of a thermoplastic material containing a foaming agent through an injection nozzle and a slideably movable runner member, moving the runner to break communication between the nozzle and mold cavity while retaining pressure within the runner and in the nozzle and mold cavity, cooling the mold and removing the molded article, replacing the mold and moving the runner member to re-establish communication between the injection nozzle and the mold cavity, the runner member being held at a sufficiently high temperature to maintain the thermoplastic material contained therein in a molten state.

2. A method for molding articles as in claim 1 in which the foaming agent decomposes to yield a gas on heating.

* * * * *